(12) United States Patent
Riche et al.

(10) Patent No.: US 12,212,205 B2
(45) Date of Patent: Jan. 28, 2025

(54) STATOR COMPRISING AN INTERCONNECTOR

(71) Applicant: VALEO EQUIPEMENTS ELECTRIQUES MOTEUR, Creteil (FR)

(72) Inventors: Christopher Riche, Creteil (FR); Mathieu D'Amico, Creteil (FR)

(73) Assignee: VALEO EQUIPEMENTS ELECTRIQUES MOTEUR, Creteil (FR)

(*) Notice: Subject to any disclaimer, the term of this patent is extended or adjusted under 35 U.S.C. 154(b) by 246 days.

(21) Appl. No.: 17/785,309

(22) PCT Filed: Dec. 17, 2020

(86) PCT No.: PCT/EP2020/086804
§ 371 (c)(1),
(2) Date: Jun. 14, 2022

(87) PCT Pub. No.: WO2021/123010
PCT Pub. Date: Jun. 24, 2021

(65) Prior Publication Data
US 2023/0027557 A1    Jan. 26, 2023

(30) Foreign Application Priority Data
Dec. 20, 2019  (FR) ...................................... 1915098

(51) Int. Cl.
*H02K 3/50*   (2006.01)
*H02K 3/28*   (2006.01)

(52) U.S. Cl.
CPC ................. *H02K 3/50* (2013.01); *H02K 3/28* (2013.01); *H02K 2203/09* (2013.01)

(58) Field of Classification Search
CPC ........ H02K 2203/09; H02K 3/28; H02K 3/38; H02K 3/50
See application file for complete search history.

(56) References Cited

U.S. PATENT DOCUMENTS 6,373,163 B1 *  4/2002  Oohashi ................... H02K 3/50
                                                    310/198
11,632,006 B2 *  4/2023  Anghel .............. H02K 15/0428
                                                    310/208

FOREIGN PATENT DOCUMENTS

FR           3046505 A1 *   7/2017
FR         3 074 376 A1     5/2019
WO      WO-2015097528 A3 *  9/2015     ............. H02K 1/146

OTHER PUBLICATIONS

WO-2015097528-A3, Hatakeyama, all pages (Year: 2015).*

(Continued)

*Primary Examiner* — Naishadh N Desai
(74) *Attorney, Agent, or Firm* — Oblon, McClelland, Maier & Neustadt, L.L.P.

(57) ABSTRACT

A stator for a rotary electric machine includes a stator body having an axis (X), and a winding including at least one overhang projecting axially from the stator body and winding ends extending axially beyond the overhang from the stator body. Also included is an interconnector mounted on the overhang of the winding, including an insulating body and at least one track having track ends. At least two winding ends are each assembled with one of the corresponding track ends, and the track ends are symmetrical relative to a plane containing the axis and relative to a plane transverse to the axis.

15 Claims, 5 Drawing Sheets

(56) References Cited

OTHER PUBLICATIONS

FR-3046505-A1, Ben all pages (Year: 2017).*
International Search Report issued Mar. 9, 2021 in PCT/EP2020/086804 filed on Dec. 17, 2020, citing documents AA & AO-AP therein, 2 pages.

* cited by examiner

STATOR COMPRISING AN INTERCONNECTOR

TECHNICAL FIELD OF THE INVENTION

The technical field of the invention relates to a rotary electric machine, in particular for a motor vehicle, in which the installation of interconnector is simplified.

The invention is applicable in the field of rotary electric machines such as alternators or reversible machines that can operate as an electric generator or an electric motor.

TECHNOLOGICAL BACKGROUND OF THE INVENTION

In a manner known per se, rotary electric machines include a stator and a rotor rigidly connected to a shaft. The rotor can be rigidly connected to a driving and/or driven shaft and can form part of a rotary electric machine in the form of an alternator, an electric motor or a reversible machine of the starter-alternator type that can operate in both modes.

The stator is mounted in a housing configured to rotatably support the shaft on bearings by means of roller bearings. The rotor is, for example, of the "claw rotor" type, and includes two pole wheels each having claws nested inside each other in order to form the poles and a core around which a rotor coil is wound. According to another example, the rotor comprises a body formed by a stack of laminations held in the form of a packet by means of a suitable fastening system. The rotor comprises poles formed for example by permanent magnets housed in cavities provided in the magnetic mass of the rotor. Alternatively, in an architecture called salient pole architecture, the poles are formed by coils wound around arms of the rotor.

Figure 1:
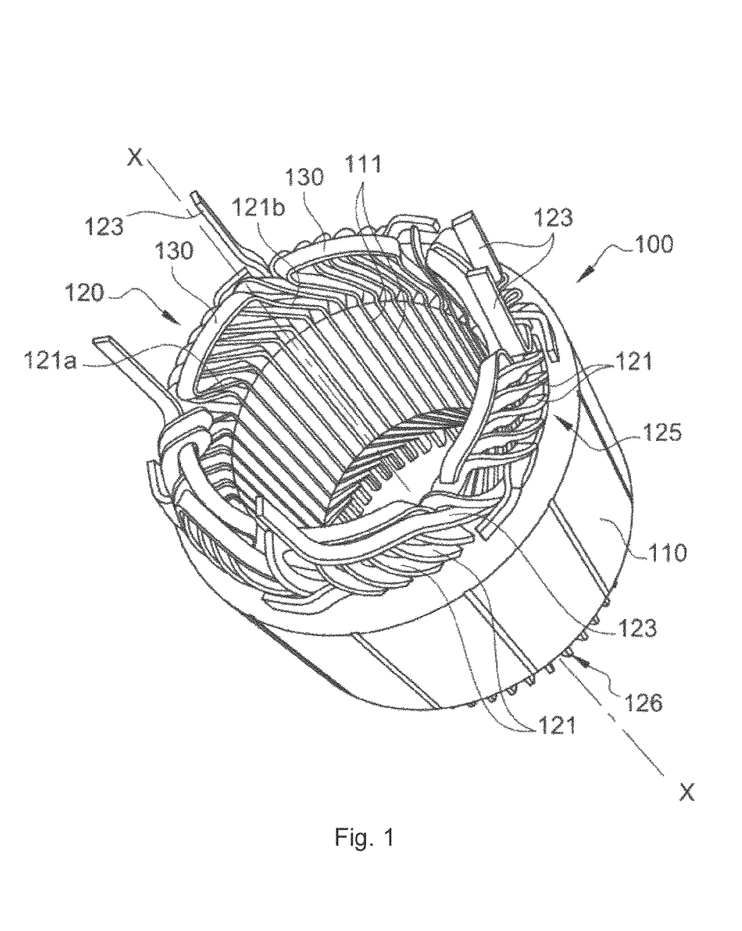
FIGS. 1 and 2, already described, show a perspective view and a partial view of a stator winding according to the prior art.

FIG. 1 is a perspective view a lamination stack and a winding of a stator according to the prior art.

Figure 2:
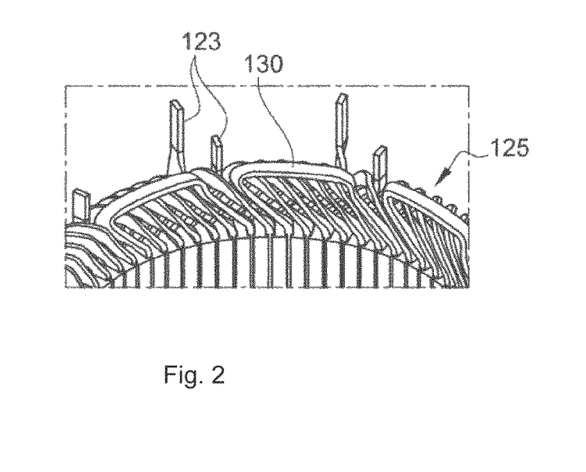

FIG. 2 is a perspective view of part of the lamination stack and the winding of the stator in FIG. 1.

Figure 3:
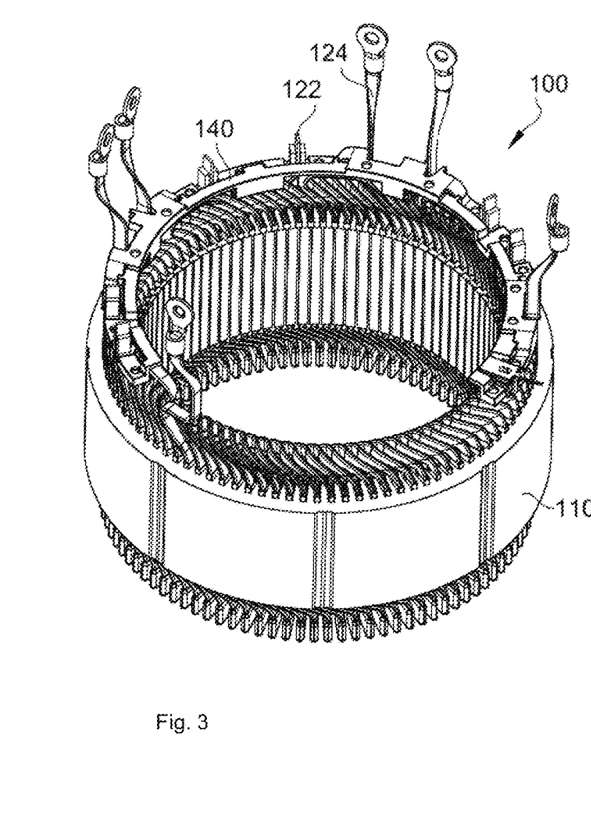
FIG. 3, already described, shows a perspective view of a stator provided with a connection component according to the prior art.

FIG. 3 is a perspective view of a stator in FIGS. 1 and 2 further including an interconnector according to the prior art.

As shown in FIGS. 1, 2 and 3, the stator 100 includes a stator body 110 formed by a stack of thin laminations forming a ring, the inner face of which is provided with slots 111 that are radially open inwardly in order to receive a winding 120 formed by phase windings. These phase windings of the winding 120 pass through the slots 111 of the stator body and form an overhang 21A, 21B on either side of the stator body 110. The phase windings of the winding 120 are polyphase windings, connected in a star or delta configuration, wherein one end of each phase winding of the winding forms a phase output 123 and each phase output 123 is connected to an electrical control module and the other end of each phase winding of the winding forms a connection point 122 that is either connected together in the case of a star configuration forming the neutral point or connected to a phase output 123 of another winding in the case of a delta configuration.

The phase windings of the winding 120 are obtained from conductive elements in the form of pins 121. A pin 121 has two branches connected by a curved head, or collateral portion, and the intermediate rectilinear portions, or central portions, of which are placed in two different slots that are angularly offset from each other by a predetermined angle. The heads of the pins 121 are twisted and form the upper overhang 21A. The phase windings of the winding 120 in this example further comprise an end half-pin comprising a single branch. The upper overhang is provided with the ends of the half-pins forming the phase outputs and the connection points are neutral points in this example. The free ends of the branches of the pins are connected to each other, for example by welding, and are twisted in order to form the lower overhang 21B, namely the downstream overhang of the winding.

The pins 121 are electrically connected to each other. Two pins 121 of the same winding are directly connected to each other, by welding for example. In this example, for each phase winding 120, the phase winding 120 comprises an inverting pin 130 connecting one end 121a of one pin to one end 121b of another pin of the winding, in particular of the same phase winding 120. In general, the inverting pins 130 are located above the upper overhang, that is, in the axial continuation of the winding, so as to connect two pins.

Each phase winding 120 therefore includes two winding ends having a phase output 124 and a connection point 122. The winding therefore includes a plurality of winding ends 124, 122. When the phase windings are star-connected, the connection point is a neutral point. When the phase windings are delta-connected, the connection point is a point making it possible to connect two separate windings in order to form the delta connection. The stator winding therefore includes a plurality of connection points 122 and a plurality of phase outputs 124 distributed along a periphery of the stator 100.

In the case of the star configuration, the connection points 122 of the same phase system must be connected together without creating electrical short circuits with the phase outputs 124 in order to maintain the power supply to the stator winding. To this end, the stator 100 generally includes an electrical connection component, also called an interconnector 140, that electrically connects the connection points 122 to each other while avoiding the phase outputs 124. Such an interconnector generally has a complex shape and, as a result, a significant footprint.

In the example of a stator shown in FIG. 3, the interconnector comprises at least one track having track ends that are each electrically connected to one of the neutral points 122 in order to connect them to each other and bypass the phase outputs 124. The manufacturing of the stator requires precise placement of the orientation of the interconnector above the overhang in a precise angular direction, in a precise axial position and in a precise radial position, due to the complex shape of said connection component.

Precise angular direction is given to mean that the interconnector must be angularly positioned so that its track ends are facing the connection points 122.

Precise axial position is given to mean that each track end must be in contact with the neutral point without being in contact with other pins.

Precise radial position is given to mean that the interconnector must be angularly positioned so that its track ends are facing the connection points 122.

SUMMARY OF THE INVENTION

The invention provides a solution to the aforementioned problems, making it possible to have an interconnector that can be connected in at least two different positions at the winding ends.

In order to address the problems set out above relating to the difficulty of manufacturing stators and the footprint of the connection components, the applicant proposes a stator for a rotary electric machine in which the interconnector is symmetrical.

According to a first aspect, the invention relates to a stator for a rotary electric machine, comprising:
- a stator body comprising an axis,
- a winding comprising at least one overhang projecting axially from the stator body and winding ends extending axially beyond the overhang from the stator body,
- an interconnector mounted on the overhang of the winding, the interconnector comprising an insulating body and at least one track comprising track ends extending from the insulating body,
- at least two winding ends of the winding ends each being assembled with one of the corresponding track ends,
- characterized in that the track ends extending from the insulating body are symmetrical relative to a plane containing the axis and angularly intersecting the middle of the interconnector and a plane transverse to the axis and axially intersecting the interconnector.

Such a stator for a rotary electric machine has a reduced risk of incorrect mounting because the interconnector comprises track ends that are symmetrical compared to the interconnectors of the machines of the prior art and therefore facilitates mounting.

Winding end is given to mean an end of a conductor of the winding, for example a phase, a neutral, or even an end of a conductor changing the repeated profile of the winding, such as the end of an inverting half-pin.

In addition to the features that have just been mentioned in the preceding paragraph, the stator according to one aspect of the invention can have one or more of the following additional features, taken individually or in any technically possible combination:

According to one embodiment, the stator comprises at least two identical interconnectors.

Identical is given to mean structurally identical, that is, in terms of functional structure, and does not therefore relate to brand, color or figurative markings such as product numbers, bar codes, etc.

The two interconnectors are for example evenly angularly distributed on the circumference of the winding overhang.

According to one example of this stator, at least two interconnectors are symmetrical relative to a plane containing the axis and angularly intersecting the middle of the interconnector and relative to a plane transverse to the axis and axially intersecting the interconnector.

Such a stator makes it possible to have a single interconnector part reference for the two interconnectors, and therefore reduces the price.

According to an example of this embodiment of this stator, the stator comprises a dual three-phase winding and the winding ends of the stator connected to one of the two interconnectors are angularly spaced apart in an identical way to the winding ends of the stator connected to the other interconnector.

This is particularly the case when the stator comprises a dual three-phase winding, in particular a distributed wave winding with inverting pin.

According to one embodiment of this stator, the winding ends connected to the interconnector are connection points of a three-phase system.

According to this embodiment, the winding comprises a star-connected three-phase system and each of the winding ends of the three-phase system assembled with one of the track ends of the interconnector is a neutral point. The interconnector can be called a neutral-point interconnector. According to one variant, the winding comprises a delta-connected three-phase system and each of the winding ends of the three-phase system assembled with one of the track ends of the interconnector is an output. The interconnector can be called a phase interconnector.

For example, in the case of a dual three-phase winding, the stator can comprise two identical neutral-point interconnectors on the winding and they each connect the neutral points of a three-phase system. The winding ends of one system exit angularly in an identical manner to those of the other three-phase system. They are for example diametrically opposite each other.

According to one embodiment of this stator, the winding ends are two ends of a connector forming an inverting pin and the interconnector comprises a single track and two track ends forming an inverting interconnector. In this example, the stator can comprise half-pins and the inverting interconnector comprises two track ends connected to each half-pin so that together they form an inverting pin. The stator can comprise one or more inverting interconnectors and one or more neutral-point interconnectors in the case of a star configuration or phase interconnectors in the case of a delta configuration.

Each inverting interconnector forming an inverting pin can thus be identical in order to facilitate winding.

According to one embodiment of this stator, the electric winding includes a plurality of electrically conductive pins connected to each other so that they form the plurality of phase windings.

For example, the interconnector is positioned at the top of the overhang.

According to some embodiments, the interconnector bears on the overhang. These embodiments make it possible to limit the vibrations within the machine when it is running.

According to one embodiment, in which the winding comprises
- a plurality of pins connected to each other so that they form a plurality of phase windings and
- inverting pins each electrically connecting two separate pins of the same phase winding, the interconnector bears on at least one of the inverting pins.

This embodiment makes it easier to install the interconnector during the manufacturing of the machine.

The interconnector of the stator according to the invention, with or without the features of the preceding embodiments, can include one or more of the following features:

According to one embodiment, the insulating body comprises two radial faces that are symmetrical relative to a radial plane, and one of the two radial faces is a radial bearing surface axially abutting on the overhang of the winding.

According to one embodiment, the interconnector includes two tracks overmolded in the insulating body having the same electrically insulating material, and one of the two track ends of the two tracks is connected to the same winding end.

According to one embodiment, the insulating body is overmolded on the track.

According to one embodiment, the interconnector also comprises at least one element for positioning the interconnector on the winding in a radial direction.

According to one example, the overhang comprises a bearing portion, the positioning element comprising at least one bearing part bearing radially on the bearing portion of the overhang.

In this example, the insulating body of the interconnector can be positioned axially against the bearing portion of the overhang and said bearing part extends axially relative to the insulating body towards the overhang, said bearing part comprising an axial surface abutting radially on an axial surface of the bearing portion of the overhang.

In this example, the positioning element can comprise first and second positioning walls, each comprising a part extending axially relative to the insulating body, and the part extending axially from the first positioning wall forms the bearing part of the positioning element. The first wall therefore comprises an axial surface bearing radially on an axial surface of the bearing portion of the overhang. The first wall and the second wall of the positioning element can be symmetrical to each other in a radial plane.

According to one variant, in this example, the interconnector comprises at least two positioning elements that are symmetrical relative to a radial plane perpendicular to the axis and passing through the middle of a height of the interconnector measured axially, and each of the two positioning elements comprises a single positioning wall having a part extending axially relative to the insulating body, and part of the wall, extending axially relative to the insulating body of one of the two positioning elements, is the bearing part bearing radially on the bearing portion of the overhang.

According to one example of this embodiment comprising the features of the preceding embodiment, the bearing portion of the overhang is an inverting pin.

According to another example, which is a variant of the preceding example, the positioning element is a positioning spur extending radially from the insulating body of the interconnector opposite the bearing portion of the overhang, the spur comprising a shape, for example an opening, suitable for interacting with a tool for holding the interconnector in position on the winding.

According to one specific feature of these two examples, the interconnector comprises at least two tracks and a second positioning element, which can be a wall or a positioning spur, so that each wall or spur is situated angularly in the middle between the two track ends of a corresponding track.

If there is only one positioning element, the positioning element can be situated axially angularly in the middle of the interconnector.

According to one example of the embodiment of the stator in which an inverting pin comprises half-pins and an inverting interconnector comprises two track ends connected to each half-pin so that together they form an inverting pin, the neutral-point interconnector or the phase interconnector is connected to the inverting connector, for example by clipping.

The neutral-point or phase interconnector and the inverting interconnector are thus held, facilitating welding.

According to one embodiment, the interconnector is symmetrical relative to a plane containing the axis and angularly intersecting the middle of the interconnector and a plane transverse to the axis and axially intersecting the interconnector.

Symmetrical is given to mean all of the external surfaces, excluding any non-operational markings such as the part number or brand of the part.

The invention also relates to a rotary electric machine comprising a stator according to the invention.

The electric machine further comprises a rotor surrounded by the stator, for example a claw rotor, the rotor comprising a rotating shaft, a bearing supporting the rotor, with the rotating shaft passing through an opening in a roller bearing of the bearing and the bearing comprising a part surrounding the stator in order to support it.

According to a second aspect, the invention also relates to a method for assembling a first interconnector according to the first aspect of the invention with a winding of a stator in which:
the interconnector comprises an insulating body, at least one track comprising track ends extending from the insulating body,
the stator comprises a stator body, and a winding comprising at least one overhang projecting axially from the stator body and winding ends extending from the stator body,
the method comprising the steps of:
positioning the symmetrical interconnector on the winding by positioning the track ends facing the winding ends,
assembling at least one winding end with a track end.

According to one embodiment of the assembly method, the interconnector comprises an element for positioning the interconnector on the winding in a radial direction and the winding comprises an inverting pin, the method further comprising a step of pressing the interconnector against the inverting pin by means of the positioning element.

According to one example of this embodiment, the positioning element is a wall comprising two radial faces extending radially from the insulating body and also extends at least partially projecting axially from the insulating body towards the overhang, and the step of positioning the interconnector on the winding is achieved by applying one of the two radial faces of the insulating body bearing axially above a radial surface of the inverting pin and by applying an axial surface of the axially projecting part against an axial surface of the inverting pin.

According to one example, the winding is a dual three-phase winding comprising a second interconnector identical to the first interconnector, and the steps of the method are carried out in duplicate, consecutively or simultaneously.

According to one example of this embodiment, the positioning element is a positioning spur comprising a shape, for example an opening, suitable for interacting with a tool for holding the interconnector in position on the winding, and the step of positioning the interconnector on the winding is achieved by assembling the spur with a tool for holding the interconnector in position on the winding, and the method further comprises a step of removing the tool.

Advantageously, the stator includes at least two interconnectors distributed on the circumference of the winding overhang.

The invention also relates to an electric machine for a motor vehicle, comprising a stator as described above with or without the different embodiments described, a rotor having the same axis as the stator surrounded by the stator, and two bearings supporting the rotor and the stator axially on either side of the stator and the rotor.

The invention and its various applications will be better understood upon reading the following description and with reference to the accompanying figures.

BRIEF DESCRIPTION OF THE FIGURES

The figures are provided by way of non-limiting example of the invention.

DETAILED DESCRIPTION

The figures are provided by way of non-limiting example of the invention.

Exemplary embodiments of a rotary electric machine, in which the interconnector is a neutral-point interconnector comprising two tracks and an insulating body made of an electrically insulating material partially overmolded on the tracks, are described in detail hereafter, with reference to the appended drawings. These embodiments illustrate the features and advantages of the invention. However, it should be noted that the invention is not limited to these embodiments. In particular, for example, the interconnector can comprise only one track and can be an inverted interconnector, the track ends of which are connected to two half-pins in order to form an inverting pin connected to two other pins of a winding, or can be a phase interconnector for connecting two phase outputs of a winding with a star configuration. Hereinafter, the neutral-point interconnector is called an interconnector.

In the figures, identical elements are identified using identical reference signs. For the sake of the readability of the figures, the elements in the figures are not shown to relative scale.

FIGS. 4A, 4B, 4C and 4D show various partial views of a rotary electric machine according to several embodiments of the invention.

Figure 4A:
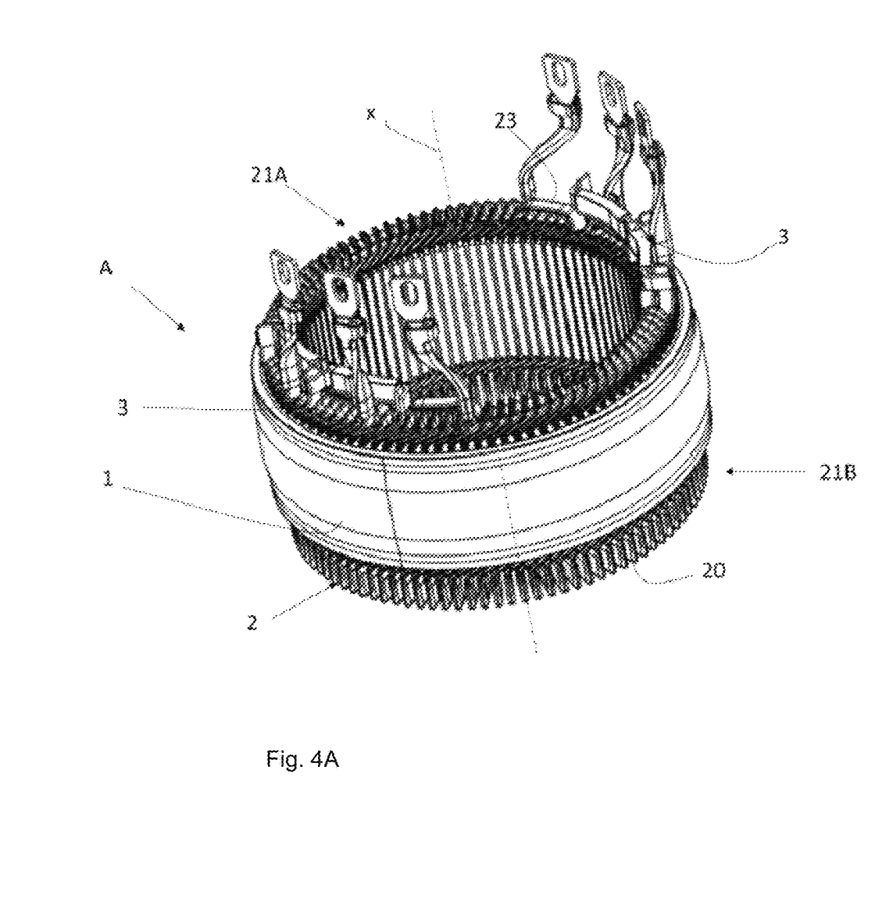
FIGS. 4A, 4B, 4C and 4D respectively show a perspective view, a partial perspective view along an axis X, a top view and a partial front view of a stator of a rotary electric machine according to one embodiment of the invention.

FIG. 4A is a perspective view of a schematic representation of a stator according to a first embodiment of the invention.

Figure 4B:
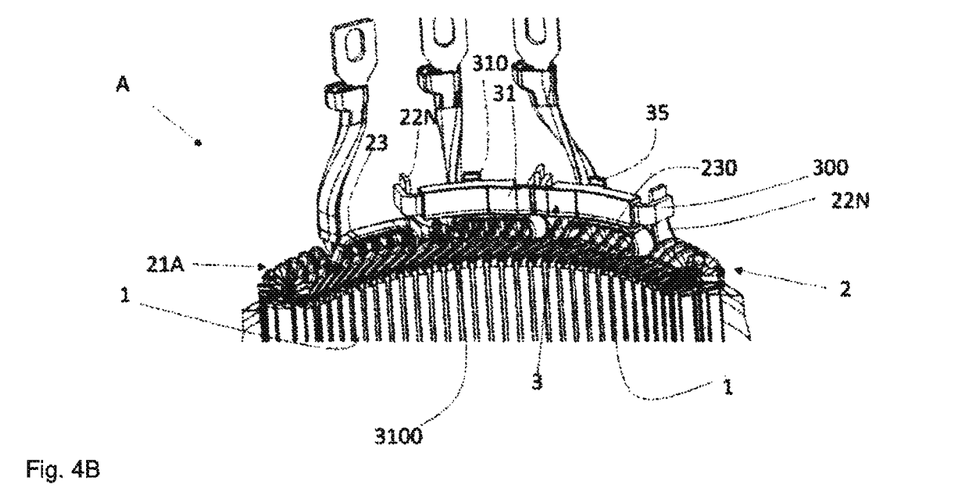

FIG. 4B is a perspective view along an axis X of a partial schematic representation of the stator in FIG. 4A according to a first embodiment of the invention.

Figure 4C:
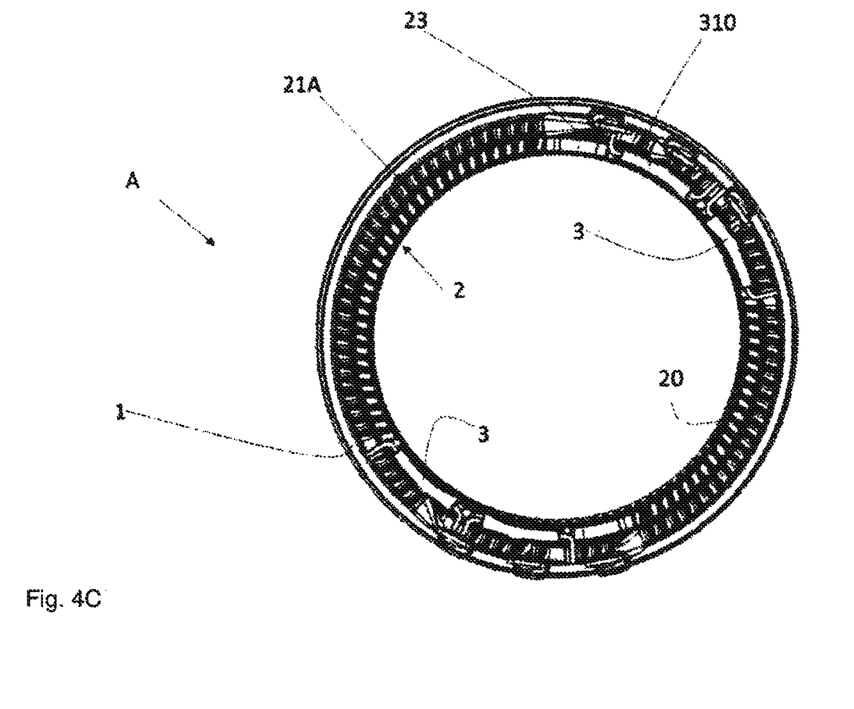

FIG. 4C is a top or axial view of a schematic representation of the stator in FIG. 4A.

Figure 4D:
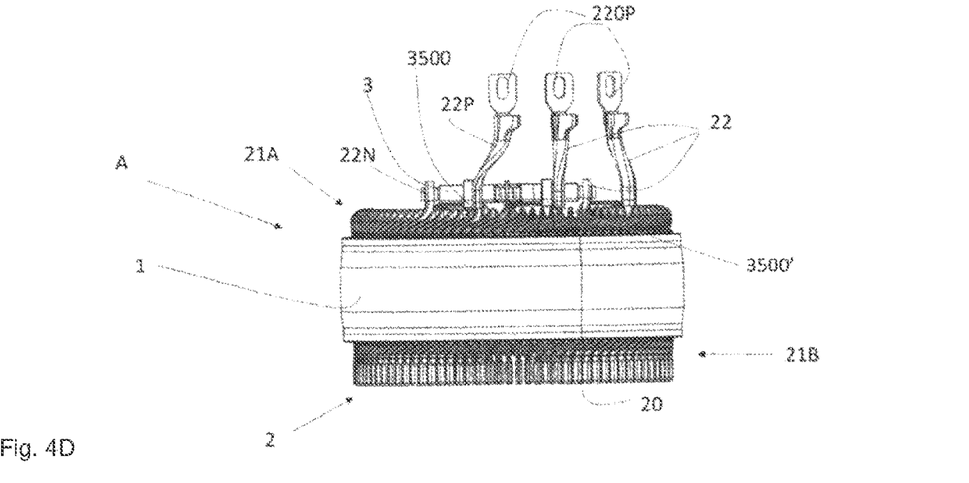

FIG. 4D is a lateral or radial view of a schematic representation of the stator in FIG. 4A.

Regardless of the embodiment taken into consideration, the rotary electric machine includes a stator A having an axis X, comprising a stator body 1 through which pass conductors 20 forming phase windings of a winding 2 of the stator A. As previously explained, the winding 2 comprises an upper overhang 21A and a lower overhang 21B at each end of the stator body 1.

The winding 2 of the stator A comprises winding ends 22 extending axially beyond the upper overhang 21A from the stator body 1, thus passing through the upper overhang 21A in this embodiment.

In this embodiment, the winding 2 is a star winding. The winding ends 22 comprise neutral points 22N and phase outputs 22P. The winding could also be a delta winding.

In this embodiment, the conductors 20 are pins. The winding also could be a wire winding. In addition, in this example of this embodiment, the winding comprises inverting pins 23 each forming a winding end 22.

An interconnector 3 is mounted in the continuation of at least one of the overhangs 21A, 21B. In the different examples shown, the stator A comprises two interconnectors 3 mounted in the continuation of the upper overhang 21A, it being understood that it could similarly be mounted in the continuation of the lower overhang 21B. In this embodiment, the two interconnectors 3 are identical. A single interconnector 3 will be described hereinafter, the other being identical.

In the examples shown, the interconnector 3 is preferably positioned in the axial continuation of the upper overhang 21A in order to limit the radial footprint, it being understood that offset positions can be envisaged for advantages other than the footprint.

The interconnector 3 includes one or more electrically conductive elements called tracks 30, for example made of copper, overmolded with an electrically insulating material forming an insulating casing, called the insulating body 31.

In this embodiment, the interconnector 3 comprises two tracks 30, each having two track ends 300.

The majority of the tracks 30 extends inside the insulating body 31 and the track ends 300 are, outside said insulating body 31, electrically connected to the winding ends 22, in this case electrically connected to the neutral points 22N of one of the two three-phase systems. The interconnector 3 with two tracks 30 extending inside the insulating body 31 is partially shown in FIG. 5.

Figure 5:
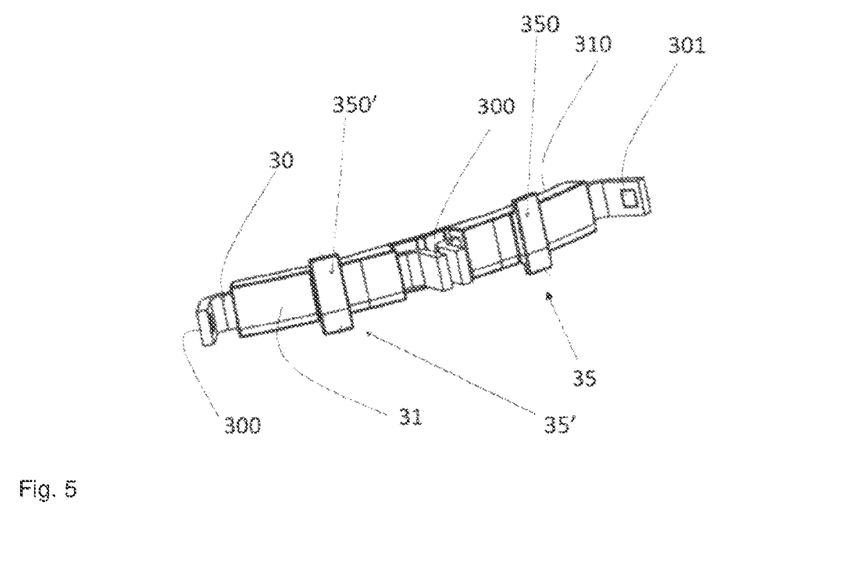
FIG. 5 shows a perspective view of the interconnector.

One of the two track ends 300 of each of the two tracks 30 is connected to the same winding end 22N.

FIG. 5 is a perspective view of a schematic representation of the interconnector of the stator A in FIG. 4A.

FIG. 5 shows greater detail of the track ends 300 of each of the tracks 30 extending radially out of said insulating body 31 in order to each form the output for connection to a neutral point 22N.

The phase windings 120 of the stator form, at each end thereof, a winding neutral point 122, and these neutral points are connected to each other by means of the interconnector 3.

To this end, each track end 300 extends radially out of the body 31, forming an angle of the order of 90° with the insulating body 31. Each track end 300 is connected, for example by laser welding or electric welding, to a neutral point 22N. This radial extension of the track ends 300 avoids any risk of damage to the insulating body 31 during the welding operations on the neutral points. The track end 300 can comprise a brazing filler alloy layer 301 to facilitate welding between the track end 300 and the winding end 22.

A neutral point 22N can be connected between the track ends 300 of two neighboring tracks. As shown in this example, the two neighboring track ends 300 of the two tracks 30 extend out of the insulating body 31 substantially parallel to each other. One of the three winding ends forming a neutral point 22N is located between these two neighboring track ends 300. The two neighboring track ends 300 are spaced apart from each other by a thickness of a winding end, in this case by a thickness of a neutral point pin or more in order to ensure assembly. The other two track ends 300 farthest from each other are each connected to a corresponding neutral point 22N. A welding operation, for example electric or laser welding, ensures the electrical connection between the neutral point 22N and each of the track ends 300. The two interconnectors 3 are positioned diametrically opposite each other on the circumference of the upper overhang 21A, each connecting three neutral points 22N. Connected is given to mean physically and not only electrically, in other words directly electrically connected without having to pass through other pins.

Said insulating body 31 of the interconnector 3 has an electrically insulating material resistant to the heat of the winding, and the interconnector 3 can thus be positioned bearing on the upper or lower overhang of the stator, which makes it possible to limit the footprint generated by the presence of the interconnector and limit the vibrations generated on said interconnector by the rotary electric machine.

In the examples of the embodiments shown, the interconnector 3 is positioned bearing on one or more inverting pins 23, which ensures stable positioning of the interconnector, in particular during the operations to install the interconnector 3. During the stator manufacturing operations, the installation of the interconnector 3 is facilitated by the positioning thereof on the inverting pins 23 and the welding of the neutral points to the interconnector is facilitated by the stability of the assembly. Other examples can also be envisaged, such as positioning the interconnector on or against or with another interconnector, for example an inverting interconnector.

The track ends 300 extending from the insulating body 31 are symmetrical relative to a plane containing the axis and angularly intersecting the middle of the interconnector and a plane transverse to the axis and axially intersecting the interconnector 3.

This means that the two interconnectors 3 can be identical and also that during manufacturing, the interconnector 3 can be positioned in two directions, thus making it possible to simplify production.

In this embodiment, the insulating body 31 comprises two symmetrical radial faces and one of the two radial faces is positioned axially on the overhang of the winding. The fact that the two radial faces are symmetrical makes it possible to position the interconnector 3 on the overhang in the same way. In this case, the radial face of the interconnector 3 is in contact on two radial faces of two inverting pins 23.

The interconnector 3 comprises at least one element 35 for positioning the interconnector 3 in a radial direction against an axial surface of the inverting pin 23 of the winding 2.

The inverting pin 23 in the overhang 21 comprises a bearing portion 230 against which the interconnector 3 bears radially and axially. In this embodiment, the positioning element 35 comprises at least one bearing part 3500 that abuts radially on the bearing portion of the overhang and the insulating body 31 abuts axially on this bearing portion of the overhang 21.

In this embodiment, the interconnector 3 comprises two positioning elements 35, which are two positioning walls, wherein at least part of one positioning wall 350 comprises the bearing part 3500 the axial surface of which bears radially on an axial surface of the bearing portion 230 of the overhang.

In this embodiment, the bearing portion 230 of the overhang is formed by one of the inverting pins 23, in this case the upper overhang 21A comprises two bearing portions 230 per three-phase system (i.e. four in total), formed by two of the three inverting pins 23. In this embodiment, the insulating body 31 of the interconnector 3 comprises two radial surfaces 310 that are symmetrical relative to a radial plane.

One of the two radial surfaces 310 is a radial surface 3100 abutting against the two bearing portions 230 of the two inverting pins 23.

The two positioning elements 35 are symmetrical relative to each other relative to an axial plane passing through the middle between the opposite track ends 300. The interconnector can thus be mounted on either side on the overhang.

Figure 6:
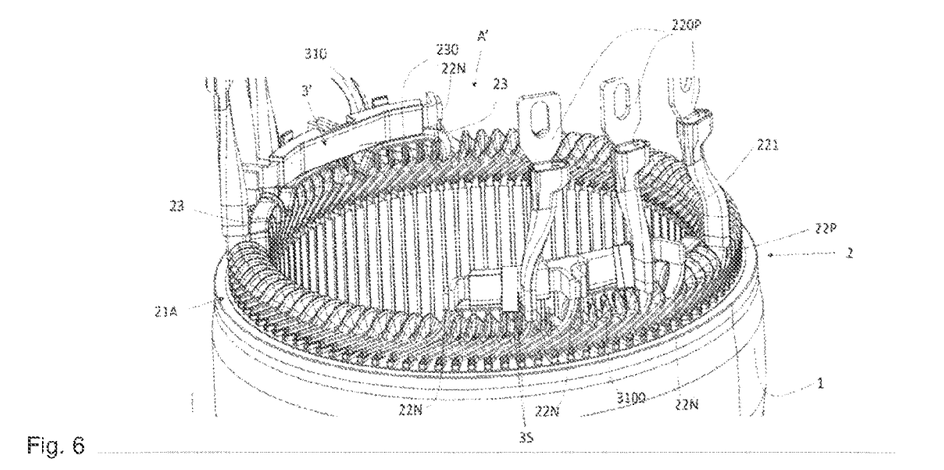
FIG. 6 shows a partial perspective view of a stator of a rotary electric machine according to one embodiment of the invention.

FIG. 6 is a partial schematic representation of the stator A on which the interconnector in FIG. 5 is mounted.

The winding ends 22 forming the phase outputs 22P protrude axially from the interconnector 3 and are also insulated by an insulator 221.

The method for assembling the interconnector on the overhang comprises the steps of:
positioning the symmetrical interconnector on the winding by positioning: the track ends 300 facing the winding ends 22 forming the neutral points 22N of a three-phase system
the bearing parts 3500 of the positioning elements 35 radially against two bearing portions 230 of two inverting pins 23, and
one of the two radial surfaces 3100 of the insulating body 31 against the radial surface 230 of two inverting pins 23.
assembling the three winding ends forming the neutral points 22N of a three-phase system by connecting each of the two neutral points 22N of the three-phase system that are angularly farthest apart from each other to the track ends 300 that are angularly farthest apart from each other and connecting the neutral point 22N located between the other two neutral points 22N to the two track ends that are closest to each other.

The above description focuses on a star-connected winding. Of course, replacing the star connection with a delta connection does not depart from the scope of the invention, the neutral points then being replaced by phase outputs 22P and the interconnector 3 being identical, for example, to the one described except in that it comprises a single track and two track ends allowing two phase windings to be connected to each other in order to form the delta connections.

Furthermore, whether the winding is star-connected or delta-connected, the inverting pins 23 can be produced by two conductors each comprising a winding end 22 connected to each other by means of an interconnector as described, except that it comprises a single track and two track ends.

Although it has been described by means of a certain number of examples, variants and embodiments, the rotary electric machine according to the invention comprises various variants, modifications and improvements that will be obvious to a person skilled in the art, it being understood that these variants, modifications and improvements form part of the scope of the invention, as defined by the following claims. For example, replacing the plurality of electrical conductors welded to each other to form the winding with continuous wires with a round or rectangular cross-section does not depart from the scope of the invention.

Unless otherwise stated, the same element appearing in different figures has a single reference sign.

The invention claimed is:
1. A stator for a rotary electric machine, comprising:
a stator body comprising an axis,
a winding comprising an overhang projecting axially from the stator body and winding ends extending axially beyond the overhang from the stator body,
an interconnector mounted on the overhang of the winding, the interconnector comprising an insulating body and a track comprising track ends extending from the insulating body, and
at least two winding ends of the winding ends each being assembled with one of the corresponding track ends,
wherein the track ends extending from the insulating body are symmetrical relative to a plane containing the axis and angularly intersecting a middle of the interconnec- tor and relative to a plane transverse to the axis and axially intersecting the interconnector, and wherein the interconnector is symmetrical relative to the plane containing the axis and angularly intersecting the middle of the interconnector and the plane transverse to the axis and axially intersecting the interconnector.

2. The stator as claimed in claim 1, wherein the stator comprises at least two identical interconnectors.

3. The stator as claimed in claim 1, wherein the winding comprises a star-connected three-phase system and each of the winding ends of the three-phase system assembled with one of the track ends of the interconnector is a neutral point.

4. The stator as claimed in claim 2, wherein the winding includes:

a plurality of pins connected to each other so that the plurality of pins form a plurality of phase windings and inverting pins each electrically connecting two separate pins of the same phase winding, the interconnector bearing on at least one of the inverting pins.

5. The stator as claimed in claim 2, wherein the insulating body comprises two radial faces that are symmetrical relative to a radial plane, and one of the two radial faces is a radial bearing surface axially abutting on the overhang of the winding.

6. The stator as claimed in claim 2, wherein the interconnector further comprises a positioning element for positioning the interconnector on the winding in a radial direction, and the overhang comprises a bearing portion, the positioning element comprising at least one bearing part bearing radially on the bearing portion of the overhang.

7. The stator as claimed in claim 6, wherein the interconnector comprises at least two positioning elements that are symmetrical relative to a radial plane perpendicular to the axis and passing through a middle of a height of the interconnector measured axially, and each of the two positioning elements comprises a positioning wall having a part extending axially relative to the insulating body, and part of the positioning wall, extending axially relative to the insulating body of one of the two positioning elements, is a bearing part bearing radially on the bearing portion of the overhang.

8. The stator as claimed in claim 2, wherein the winding comprises a star-connected three-phase system and each of the winding ends of the three-phase system assembled with one of the track ends of the interconnector is a neutral point.

9. The stator as claimed in claim 3, wherein the winding includes:

a plurality of pins connected to each other so that the plurality of pins form a plurality of phase windings and inverting pins each electrically connecting two separate pins of the same phase winding, the interconnector bearing on at least one of the inverting pins.

10. The stator as claimed in claim 3, wherein the insulating body comprises two radial faces that are symmetrical relative to a radial plane, and one of the two radial faces is a radial bearing surface axially abutting on the overhang of the winding.

11. The stator as claimed in claim 3, wherein the interconnector further comprises a positioning element for positioning the interconnector on the winding in a radial direction, and the overhang comprises a bearing portion, the positioning element comprising at least one bearing part bearing radially on the bearing portion of the overhang.

12. The stator as claimed in claim 4, wherein the insulating body comprises two radial faces that are symmetrical relative to a radial plane, and one of the two radial faces is a radial bearing surface axially abutting on the overhang of the winding.

13. The stator as claimed in claim 4, wherein the interconnector further comprises a positioning element for positioning the interconnector on the winding in a radial direction, and the overhang comprises a bearing portion, the positioning element comprising at least one bearing part bearing radially on the bearing portion of the overhang.

14. The stator as claimed in claim 5, wherein the interconnector further comprises a positioning element for positioning the interconnector on the winding in a radial direction, and the overhang comprises a bearing portion, the positioning element comprising at least one bearing part bearing radially on the bearing portion of the overhang.

15. The stator as claimed in claim 6, wherein the interconnector further comprises a positioning element for positioning the interconnector on the winding in a radial direction, and the overhang comprises a bearing portion, the positioning element comprising at least one bearing part bearing radially on the bearing portion of the overhang.

* * * * *